Jan. 31, 1933.    C. R. STOUGH    1,895,499
PRESSED STEEL HUB
Filed May 1, 1931
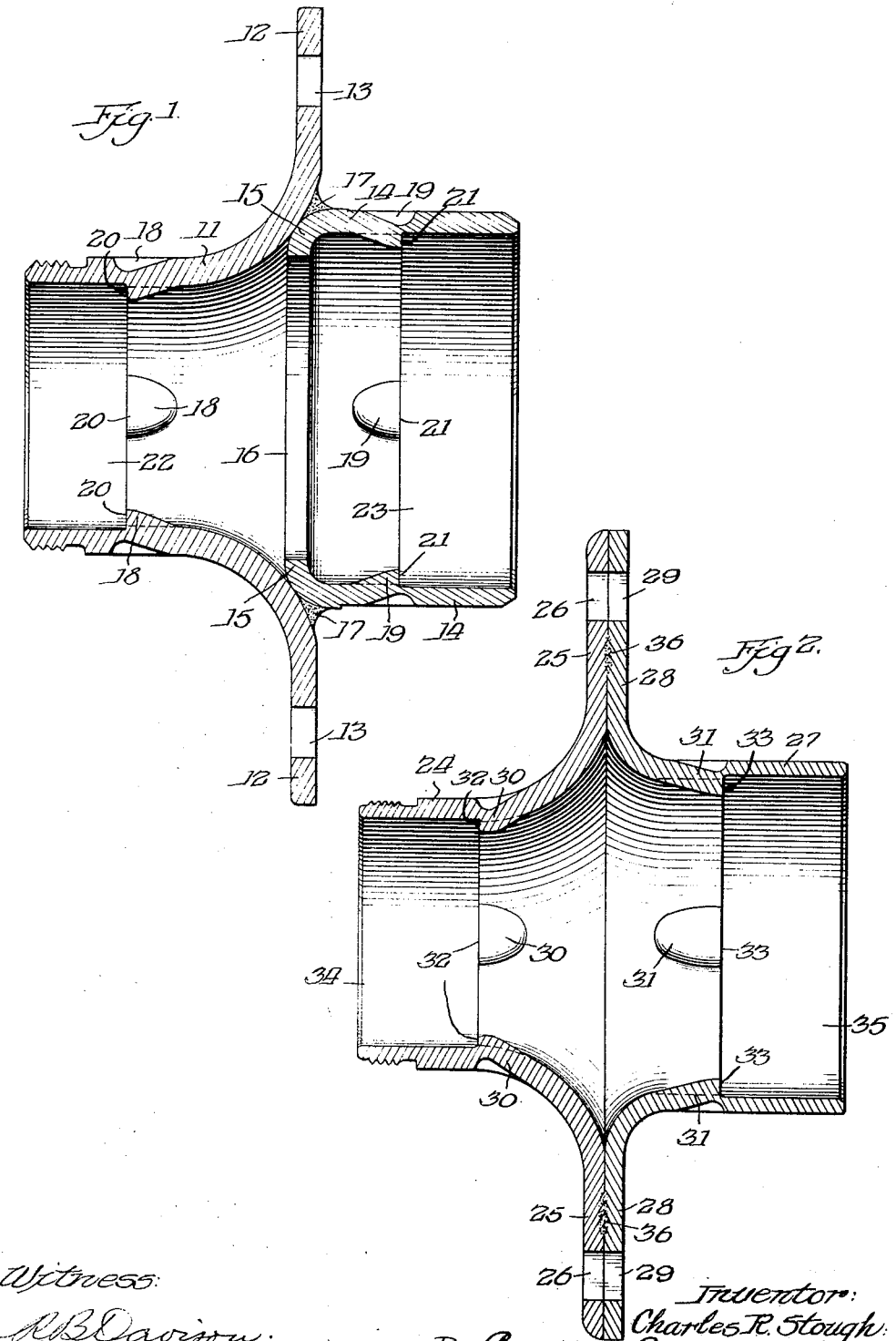

Patented Jan. 31, 1933

1,895,499

UNITED STATES PATENT OFFICE

CHARLES R. STOUGH, OF LANSING, MICHIGAN, ASSIGNOR TO MOTOR WHEEL CORPORATION, OF LANSING, MICHIGAN, A CORPORATION OF MICHIGAN

PRESSED STEEL HUB

Application filed May 1, 1931. Serial No. 534,186.

The object of the present invention is the provision of a hub structure embodying lightness, strength and economy of manufacture from standpoints of labor, machine operations and material.

Instead of forging and machining from a bar or billet, I utilize rolled sheets and, by punching and pressing operations, form two tubular hub-portions of the same or dissimilar diameters, flange one end of each hub portion either both outwardly or both inwardly or one outwardly and the other inwardly. I then place the flanges in surface contact and weld; thus producing a unitary hub structure with the axle-receiving barrel portion of uniform or non-uniform diametric section and contour and with external radial flange for mounting the wheel body,—all at a minimum expense of labor and material, both light and strong.

In order that the invention may be readily understood, two embodiments of the same are set forth in the accompanying drawing and in the description predicated thereon, by way of illustration.

In the drawing

Fig. 1 is a diametric section through one form of hub structure embodying the invention; and Fig. 2 is a similar view of another form of construction.

Having particular reference to Fig. 1, an annular plate is by suitable pressing, drawing and punching operations formed into a tubular portion 11 and a radially-extending flanged portion 12 suitably apertured locally at 13 for the reception of securing bolts or rivets by which the completed hub structure may be attached to a wheel body.

A second plate is by an appropriate drawing operation formed into a tubular portion 14 having an inturned flange 15 about an axial opening 16.

The two tubular members thus formed are placed in axial alignment with their flanged portions in surface contact, preferably along the root of the flanges, and are permanently welded together as at 17.

Either before or after forming and attaching, the barrel portions 11 and 14 of the hub structure are locally indented inwardly as at 18 and 19 and provide internal abutments at 20 and 21 for the bearing liners 22 and 23.

Referring now to Fig. 2 of the drawing, a modified construction is shown wherein an annular plate, by pressing, drawing and punching operations is formed into a tubular portion 24 and a radially-extending flanged portion 25 provided with bolt or rivet-receiving apertures at 26, and a second plate is by appropriate operations formed into a tubular portion 27 with a radially-extending flanged portion 28 with bolt apertures 29.

The tubular barrel portion 24 and the tubular barrel portion 27 are inwardly indented at 30 and 31 to provide internal abutments 32 and 33 for the bearing liners 34 and 35.

The two barrel portions thus formed are placed in axial alignment with their outturned flanges 25 and 28 in surface contact and with the apertures 26 and 29 in register. They are then secured together by spot welding at intervals as indicated at 36.

I claim:

1. A hub structure comprising front and rear tubular barrel portions arranged end to end in abutting fixedly attached relation, one of the abutting ends expanded and the other contracted to form respectively an outwardly projecting wheel-attaching flange and an inwardly projecting stiffening flange in a common transverse plane.

2. A hub structure comprising front and rear tubular barrel portions of dissimilar diameter arranged end to end, the smaller end expanded to form an outwardly projecting wheel-attaching flange and the larger end contracted to form an inwardly projecting stiffening flange, the two flanges disposed in a common plane, the flanged ends providing convex abutting faces and fixedly secured together.

3. A hub structure comprising a rear tubular barrel portion and a front tubular barrel portion of smaller diameter, the end of the front portion expanded to form an outwardly projecting wheel-attaching flange and the adjacent end of the rear portion contracted to form an inwardly projecting stiffening flange, the two flanges occupying substantially common planes, the flanged ends providing abutting convex faces and fixedly attached by welding.

In testimony whereof I have hereunto subscribed my name.

CHARLES R. STOUGH.